Patented May 2, 1950

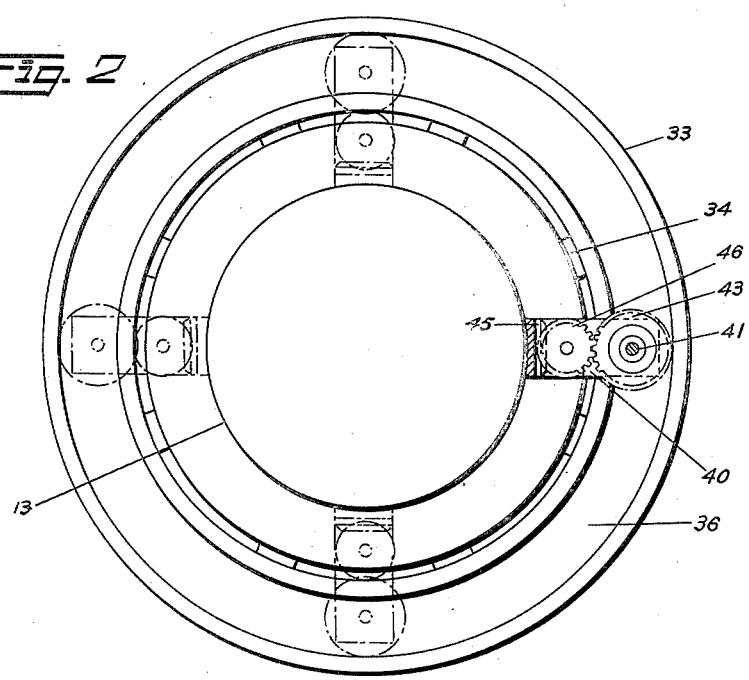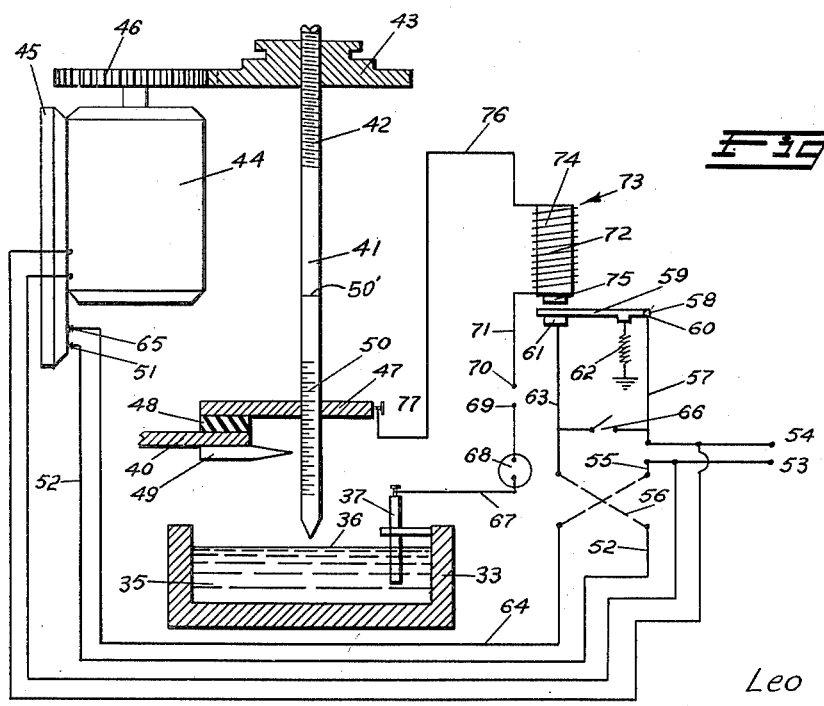

2,505,812

UNITED STATES PATENT OFFICE 2,505,812

LEVELING APPARATUS AND METHOD

Leo Theimer, New York, N. Y.

Application July 9, 1945, Serial No. 603,997

6 Claims. (Cl. 51—165)

(Granted under the act of March 3, 1883, as amended April 30, 1928; 370 O. G. 757)

The present invention relates to an apparatus and method for leveling an object with reference to a level liquid surface, and more specifically the invention relates to an electrical arrangement for measuring the distance from an index point on an object to a level liquid reference surface.

In the construction of large and heavy precision machines of the type having a rotary turret for carrying a tool such as a polishing tool, it is customary to design the machine so that it can be mounted upon a supporting deck with the axis of the turret disposed vertically so that the tool can revolve with the turret while rotating upon its own axis to perform the polishing. The work to be machined is customarily disposed above the rotary tool turret and is rigidly supported independently of the machine upon standards mounted on the supporting deck.

In performing precision machining operations it is essential that the piece of work shall be accurately and precisely positioned with respect to the machine tool. For example, in using a precision machine such as a Sellers machine for polishing the lower bearing surface of the rotary carriage for a large-caliber multiple-gun mount it is necessary that the Sellers machine and carriage bearing surface be accurately positioned relative to each other so that the upper polishing surface of the machine tool in operation describes a path coincident with the lower bearing surface of the carriage to be polished.

To insure accurate positioning of the work and machine with respect to each other it is found convenient to establish a liquid body having a level free surface and to level the machine by reference to the liquid surface with subsequent leveling of the work by reference either to the liquid surface or previously leveled machine. A suitable arrangement for leveling the machine is to establish the liquid body in an annulus surrounding the rotary tool turret and to establish an index point on the rotary tool turret so that a micrometer measurement of the distance from the index point to the liquid surface can be made. By making such measurements in several different positions of rotation of the rotary tool turret it is possible to detect any tilt in the machine and to make adjustments to bring the machine into level position.

The work to be polished can then be leveled with reference to the machine by taking micrometer measurements of distance from the index point on the rotary tool turret to the lower bearing surface to be machined. Taking such measurements in different positions of rotation of the rotary tool turret makes it possible to detect any tilt in the work and adjustments can be made to bring the work into level position. If desired, the work can be leveled by reference to the liquid surface instead of reference to the leveled machine by making micrometer measurements of the distance from the lower bearing surface of the work to the liquid level at different points.

Because it is necessary that the leveling of the work and machine be accomplished with precision, the micrometer measurements must be made with precision. Experience has shown that when such measurements are made manually and when contact between the end of the micrometer and the surface of the liquid is estimated by eye sufficient errors of manipulation and estimation are introduced to cause perceptible inaccuracies in the leveling operation.

The present invention overcomes these objections by providing means for making the necessary micrometer measurements automatically and eliminating human error. In measuring the distance from the index point of the rotary tool turret to the liquid reference surface, preferably an electric motor is arranged to move the micrometer relative to the index point on the rotary tool turret, and to bring one end of the micrometer into contact with the liquid surface, an additional electrical system being provided automatically to stop the electric motor and arrest the micrometer upon contact of the end of the micrometer with the liquid surface.

An object of this invention is to provide an apparatus and method for leveling an object with respect to a level reference surface formed by a liquid body.

Another object is to provide an apparatus and method for positioning a pair of objects relative to each other by leveling the objects with respect to a level reference surface formed by liquid body.

Another object is to provide an apparatus for automatically measuring the distance from an index point on an object to a level reference surface formed by a liquid body.

Another object is to provide a micrometer for measuring the distance from an index point on an object to a reference surface formed by a liquid body together with electrical means for moving the micrometer relative to the index point and into contact with the liquid surface and additional electrical means for arresting the micrometer upon contact with the liquid surface.

Further objects and advantages of this invention, as well as its construction, arrangement and operation, will be apparent from the following description and claims in connection with the accompanying drawings in which, Fig. 1 is a front elevational view showing a preferred embodiment of the invention.

Fig. 2 is a top plan view of Fig. 1 with certain parts omitted for clarity of illustration. Phantom lines indicate various rotational positions of the micrometer and driving motor.

Fig. 3 is a schematic diagram showing the electrical arrangement for automatically performing the measuring operation.

Figure 1:
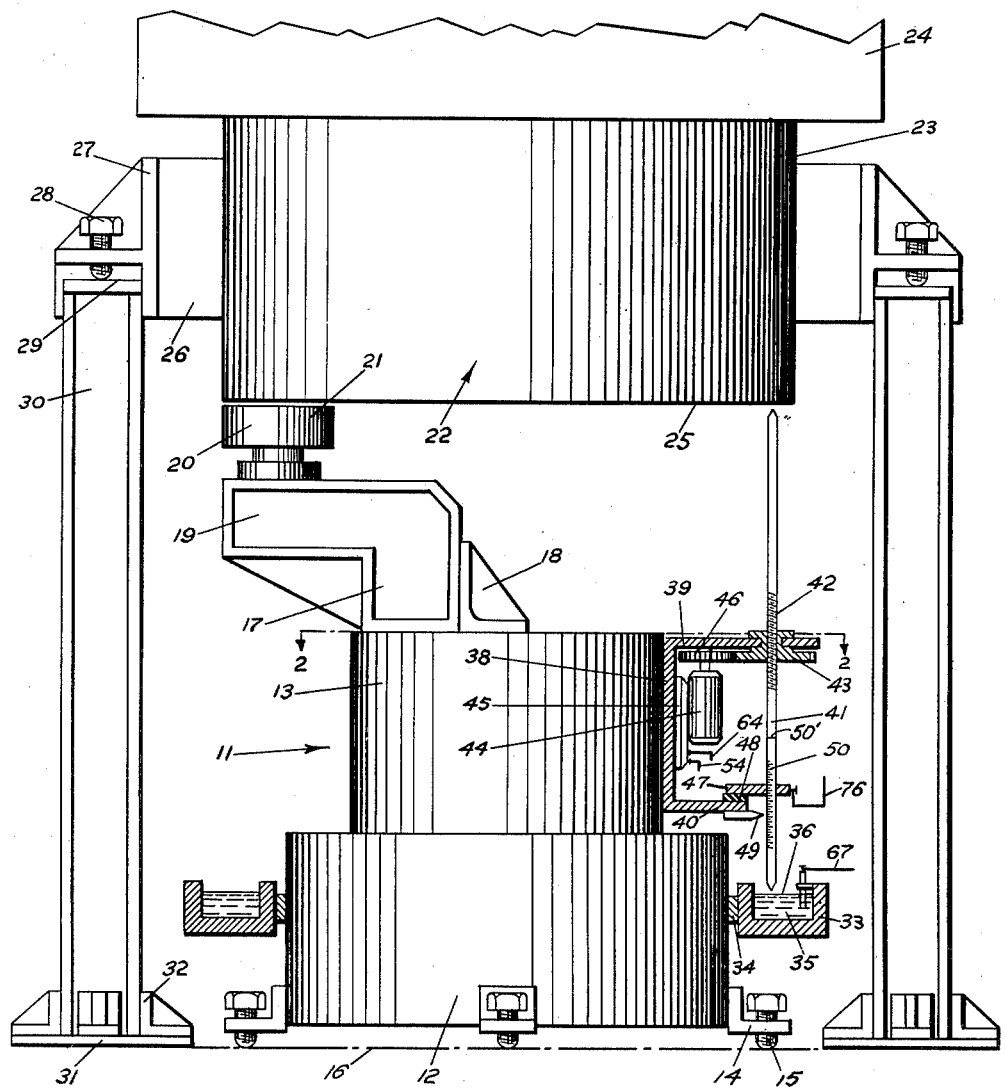

Fig. 1 shows a machine 11 having a fixed base 12 and a rotary tool turret 13. Base 12 is supported by means of brackets 14 and adjustment screws 15 upon a supporting deck 16. Adjustment of screws 15 permits leveling of machine 11. Mounted on the top of rotary tool turret 13 is a tool support 17 that is secured thereto in any suitable manner as, for example, by welding. A bracket 18 serves to aid in anchoring support 17 in place. Tool support 17 is provided with an offset arm 19 adapted to support a rotary tool 20 having an upper surface 21 adapted to perform a polishing operation. In operation turret 13 rotates and carries tool 20 along with it while at the same time tool 20 is rotating upon its own axis. Tool 20 therefore simultaneously revolves about the turret axis and rotates about its own axis to perform the polishing operation.

Disposed above tool 20 is a piece of work 22 comprising a cylindrical carriage portion 23 for a multiple-gun mount 24. Carriage 23 is provided with a lower bearing surface 25 to be polished by means of tool 20. Workpiece 22 is supported in place by means of cheek blocks 26 that are welded thereto and secured in any suitable manner to brackets 27. Each bracket 27 is supported by means of an adjustment bolt 28 upon the seating surface 29 of a vertically disposed standard 30. Each standard 30 is supported upon a base plate 31 disposed on deck 16 and is secured in place by means of brackets 32. Adjustment of bolts 28 is made to level workpiece 22.

Disposed about machine base 12 is an annular trough 33 that is secured to machine base 12 by means of supporting blocks 34 preferably made of electrically-insulating material. Disposed within trough 33 is a liquid body 35 having a free level surface 36. Liquid 35 is composed of any suitable electrically conductive substance. Depending into the liquid body 35 is an electrode 37 supported by trough 33.

Secured to the side wall of rotary tool turret 13 in any suitable manner is a bracket 38 having an upper horizontal arm 39 and a lower horizontal arm 40. Adapted for vertical reciprocation with respect to bracket 39 is a micrometer 41 having a threaded portion 42 adapted for threading through an idler gear 43 supported for rotation on bracket arm 39. Power for rotating idler gear 43 is supplied by an electric motor 44 mounted by means of a base 45 upon bracket 38 and having a driving gear 46 that meshes with idler gear 43. Operation of motor 44 causes rotation of driving gear 46 and idler gear 43 which by means of threads 42 causes vertical movement of micrometer 41.

Lower bracket arm 40 is provided with a guide plate 47 insulated therefrom by an insulating block 48. Guide plate 47 serves to guide micrometer 41 in its vertical movement toward and away from the liquid surface 36. An index finger 49 is mounted on bracket arm 40 and adapted to register with calibration marks 50 on micrometer 41. Micrometer 41 is preferably designed so that the lower portion thereof which is adjacent and below guide plate 47 is electrically conductive and adapted to form part of an electric circuit to be hereinafter described. The upper portion of micrometer 41 above guide plate 47 is insulated from the lower conductive portion as seen at 50'.

The electrical system for moving micrometer 41 is illustrated in Fig. 3. A circuit is provided including the electric motor 44 that has a binding post 51 and is connected by means of a conductor 52 through a reversing switch 56 and conductor 55 to a power terminal 53. The other power terminal 54 is connected by a conductor 57 to a terminal 58 of an armature 59 pivoted as indicated at 60 and held against contact 61 by means of a spring 62. Contact 61 is connected by means of a conductor 63 through reversing switch 56 and conductor 64 to the other binding post 65 of motor 44. A knife switch 66 is provided across lines 63 and 57. With terminals 53 and 54 connected to a suitable source of power (not shown), reversing switch 56 can be closed to cause operation of motor 44, rotation of drive gear 46, and rotation of idler gear 43 to effect movement of micrometer 41. Reversing of switch 56 causes opposite rotation of motor 44 and gears 46 and 43 to cause reversed movement of micrometer 41.

A second circuit is provided including electrode 37 connected by means of a conductor 67 in series with a lamp 68 and one terminal 69 of a suitable source of power (not shown). The other power terminal 70 is connected by means of a conductor 71 to winding 72 of a relay 73 provided with a core 74 and a pole piece 75. The end of winding 72 is connected by means of a conductor 76 to a binding post 77 on guide 47. The circuit is completed by the lower end of micrometer 41 and liquid body 35 both of which are electrically conductive as hereinbefore described. The lower tip of micrometer 41 constitutes a movable electrical contact which can be moved toward or away from liquid surface 36 which constitutes a second electrical contact. With terminals 69 and 70 connected to a suitable source of power (not shown), whenever micrometer 41 is moved by motor 44 into contact with liquid surface 36, the circuit is closed and relay 73 is energized to attract armature 59 away from contact 61 to open the circuit including motor 44 whereby motor 44 is stopped and micrometer 41 is arrested.

In operation, machine 11 is mounted upon deck 16 and adjusted by means of screws 15 into approximately level position. Workpiece 22 is then mounted by means of cheek blocks 26, brackets 27 and standards 30 upon deck 16. By adjustment of screws 28 workpiece 22 is brought into approximately level position.

Final accurate leveling of machine 11 and workpiece 22 is accomplished in the following manner. Annular trough 33 is mounted in position about machine base 12 by means of supporting brackets 34 and filled to a suitable depth with liquid 35. Since liquid 35 has a free surface 36 the latter is level regardless of any tilting that is present in trough 33. Bracket 38 is then mounted upon rotary tool turret 13 and motor 44, drive gear 46, idler gear 43, micrometer 41 and guide plate 47 are assembled as shown in Fig. 1, with the lower end of micrometer 41 withdrawn from liquid surface 36. Electrical connections are made to the various parts as indicated in Fig. 3 with terminals 53 and 54 connected to any suitable source of power (not shown). Terminals 69 and 70 are connected to a suitable source of power (not shown). Reversing switch 56 and knife switch 66 are in open-circuit position.

A measurement of the distance from index point 49 to liquid surface 36 is now made by closing switch 56 so that motor 44 causes rotation of drive gear 46 and idler gear 43 to move micrometer 41 downwardly. Upon contact of the lower end of micrometer 41 with liquid surface 36 the circuit including conductive liquid body 35 and electrode 37 is closed to energize relay 73 and cause withdrawal of armature 59 away from contact 61 whereby the circuit including motor 44 is opened and micrometer 41 is arrested. Lamp 68 is lighted under these conditions to indicate that micrometer 41 has been arrested and a reading should be made. A reading of the calibration mark that is in registration with index 49 is taken to indicate the distance between the index point and liquid level 36.

Switch 56 is next thrown into a reverse position and knife switch 66 closed to close the circuit when relay armature 59 is in open position whereby motor 44 reverses and by means of drive gear 46 and idler gear 43 causes upward movement of micrometer 41. Reversing switch 56 is opened to arrest micrometer 41 in a position wherein the lower extremity thereof is slightly withdrawn from liquid surface 36. Separation of micrometer 41 from liquid surface 36 causes relay 73 to become de-energized with the result that armature 59 returns under the influence of spring 62 into engagement with contact 61. Knife switch 66 is thereupon opened and the electrical circuits are conditioned for making another measurement.

Rotary tool turret 13 can be rotated into several other positions and readings of the distance from index 49 to liquid surface 36 made for each position. Variations in the readings indicate tilting in machine 11 with respect to level liquid reference surface 36 and an adjustment of screws 15 can be made to correct such tilt and bring the machine into level position.

Workpiece 22 can be leveled with respect to previously leveled machine 11 by measuring the distance between index 49 on machine 11 and lower bearing surface 25 of workpiece 22 that is to be polished. Measurement can be made by the following procedure. With the electrical circuit arranged as described above in connection with the operation of leveling machine 11, switch 56 is closed to operate motor 44 and cause upward movement of micrometer 41. Upon contact of the upper end of micrometer 41 with bearing surface 25, reversing switch 56 is opened to arrest micrometer 41 and a reading made of the calibration mark 50 that registers with index 49. Switch 56 is then reversed to withdraw micrometer 41 a suitable distance from bearing surface 25 and switch 56 is then opened to arrest micrometer 41 and condition the system for another measurement. Rotary tool turret 13 is turned into several different positions and measurements in each position made. Variations in the measurements of the different positions indicate tilting of workpiece 22 and adjustment of screws 28 is made to bring the workpiece into level position.

In leveling workpiece 22 as described contact between the upper end of micrometer 41 and bearing surface 25 is estimated by eye. However, if desired, an automatic electrical arrangement analogous to that provided with liquid body 35 can be used so that the measurement is fully automatic.

Also if desired workpiece 22 can be leveled by direct reference to liquid surface 36 instead of referring to previously leveled machine 11.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. The method of leveling a pair of objects each having an index surface that comprises establishing a liquid body having a free surface forming a level reference surface, disposing the first of said index surfaces approximately parallel to said reference surface, establishing an index point in said first index surface, rotating said first index surface about an axis perpendicular thereto, measuring the distances between said index point and said reference surface at three or more positions of rotation of said index point, adjusting the object having said first index surface until said distances measure substantially the same whereby said first index surface is made parallel to said reference surface, disposing the second of said index surfaces approximately parallel to said first index surface, rotating said first index surface about an axis perpendicular thereto, measuring the distances between said index point and said second index surface at three or more points of rotation of said index point, and adjusting the object having the second index surface until said distances measure substantially the same whereby said second index surface is made parallel to said first index surface.

2. In combination, a machine having a portion mounted for rotation about a vertical axis and means for leveling said machine comprising adjustment screws for supporting said machine upon a supporting surface and also comprising a container having a body of liquid having a free surface forming a level reference plane, an index on said machine, measuring means mounted for vertical movement to measure the distance from said index to said reference surface, an electric motor for causing downward movement of said measuring means to bring the lower end thereof into contact with said reference surface, an electrical contact on the lower end of said measuring means, an electrical contact included in said liquid reference plane, and electrical means interconnecting said contacts and motor whereby closing of said contacts will stop said motor and arrest said measuring means.

3. An electrical system for measuring the distance from an object to the surface of an electrically conducting liquid body that forms a reference surface by means of a scale adapted to move relative to the object to bring one end of the scale in contact with the liquid surface, said electrical system comprising a first electrical contact on the end of the scale for movement toward said reference surface, a circuit including a motor for moving said scale toward said reference surface which forms a second electrical contact, an armature switch in series with said motor and adapted to be in closed-circuit position when said contacts are separated, a second circuit including said contacts, and a relay in series with said contacts and positioned adjacent said armature switch whereby closing of said contacts causes said relay to become energized and open said armature switch to stop said motor and arrest said scale.

4. The method of leveling an object having an index surface which comprises providing a liquid body having a free surface forming a level reference surface, disposing the index surface approximately parallel to said reference surface, establishing an index point on said index surface, rotating said index surface about an axis perpendicular thereto, measuring the distances between said index point and said reference surface at three or more positions of rotation of said index point, and adjusting the object until said distances are equal so that said index surface is parallel to said reference surface.

5. In combination, a machine having a portion mounted for rotation about an axis, means for tipping said portion, a container having therein electrically conducting liquid having a free surface extending around said axis, an index associated with said rotatable portion, and electrical means for measuring the distances between said surface and said index at a plurality of positions taken by said index upon the rotation of said rotatable portion, said electrical means including a circuit including at least a portion of said liquid, whereby said rotatable portion may be tipped to make those distances equal which in turn assures said axis being in line with gravity and any surface of said rotatable portion perpendicular to said axis being horizontal.

6. In combination, a machine having a portion mounted for rotation about an axis, means for tipping said portion, a container having therein electrically conducting liquid having a free surface at a plurality of points around said axis, an index associated with said rotatable portion, and electrical means for measuring the distances between said surfaces and said index at a plurality of positions taken by said index upon the rotation of said rotatable portion, said electrical means including a circuit including at least a portion of said liquid, whereby said rotatable portion may be tipped to make those distances equal which in turn assures said axis being in line with gravity and any surface of said rotatable portion perpendicular to said axis being horizontal.

LEO THEIMER.

REFERENCES CITED

The following references are of record in the file of this patent:

UNITED STATES PATENTS

| Number | Name | Date |
|---|---|---|
| 2,294,831 | Carson | Sept. 1, 1942 |
| 2,385,247 | Yeomans | Sept. 18, 1945 |